United States Patent [19]

Sterritt et al.

[11] Patent Number: 4,717,792
[45] Date of Patent: Jan. 5, 1988

[54] SEALED JOINTING APPARATUS

[76] Inventors: James L. Sterritt, 6 Green Row, Castleward, Strangford, County Down; George M. Hay, Cloughram Mill House, Knocksticken Road, Downpatrick BT30 8RE, both of Ireland

[21] Appl. No.: 852,307
[22] PCT Filed: Aug. 5, 1985
[86] PCT No.: PCT/GB85/00349
 § 371 Date: Apr. 1, 1986
 § 102(e) Date: Apr. 1, 1986
[87] PCT Pub. No.: WO86/01351
 PCT Pub. Date: Feb. 27, 1986

[30] Foreign Application Priority Data

Aug. 3, 1984 [GB] United Kingdom ............... 8419887

[51] Int. Cl.⁴ ............................................. H02G 15/08
[52] U.S. Cl. ............................ 174/93; 174/88 C; 285/161
[58] Field of Search ............... 174/93, 88 C; 285/161, 285/331

[56] References Cited

U.S. PATENT DOCUMENTS

| 1,809,582 | 6/1931 | Church ............................ 285/161 |
| 3,130,259 | 4/1964 | Rischard et al. ................. 174/93 |
| 3,197,241 | 7/1965 | Anthon .......................... 285/161 X |
| 3,332,433 | 7/1967 | Edmondson .................... 285/161 X |
| 3,381,082 | 4/1968 | Peterson ......................... 174/93 |
| 3,449,507 | 6/1969 | Channell ......................... 174/93 |
| 3,518,358 | 6/1970 | Brown ............................ 174/93 |
| 3,557,299 | 1/1971 | Dienes ............................ 174/38 |
| 3,624,594 | 11/1971 | Trimble et al. .................. 174/93 |
| 3,784,730 | 1/1974 | Bannies ........................... 285/161 X |
| 3,885,087 | 5/1975 | Takada et al. ................... 174/93 |
| 4,000,918 | 1/1977 | Reker .............................. 285/161 X |
| 4,347,402 | 8/1982 | Reyners .......................... 174/93 X |
| 4,381,425 | 4/1983 | Maricevic et al. ............... 174/93 |
| 4,491,685 | 1/1985 | Drew et al. ..................... 174/88 C |
| 4,549,755 | 10/1985 | Kot et al. ....................... 285/354 X |

FOREIGN PATENT DOCUMENTS

| 846714 | 6/1952 | Fed. Rep. of Germany . |
| 1322759 | 7/1973 | United Kingdom . |
| 2060278 | 4/1981 | United Kingdom ............... 174/93 |

Primary Examiner—Morris H. Nimmo
Attorney, Agent, or Firm—Brady, O'Boyle & Gates

[57] ABSTRACT

Sealed jointing apparatus is for use in the connection of conduit sections, at a connection zone, especially but not exclusively telecommunication cable sections. The apparatus comprises end closure means (3) bounding the connection zone and surrounding the respective conduit sections (2). Primary seal means (9) is for location between the end closure means (3) and the conduit sections (2). Casing means (17) surrounds the end portions of the conduit sections at said connection zone, and releasable securing means (19) for sealingly securing the casing means and the closure means (3). The conductor splices in joined telecommunication cable sections can be contained in a hermetically sealed zone bounded by the end closure means (3) and the casing (17) and access can be had to the cable splices simply by releasing the releasable securing means (19) and pushing the casing (17) aside. The end closure means (3) remain in position and the primary seal means (9) are untouched. Closure of the joint simply comprises the reverse of this operation.

10 Claims, 9 Drawing Figures

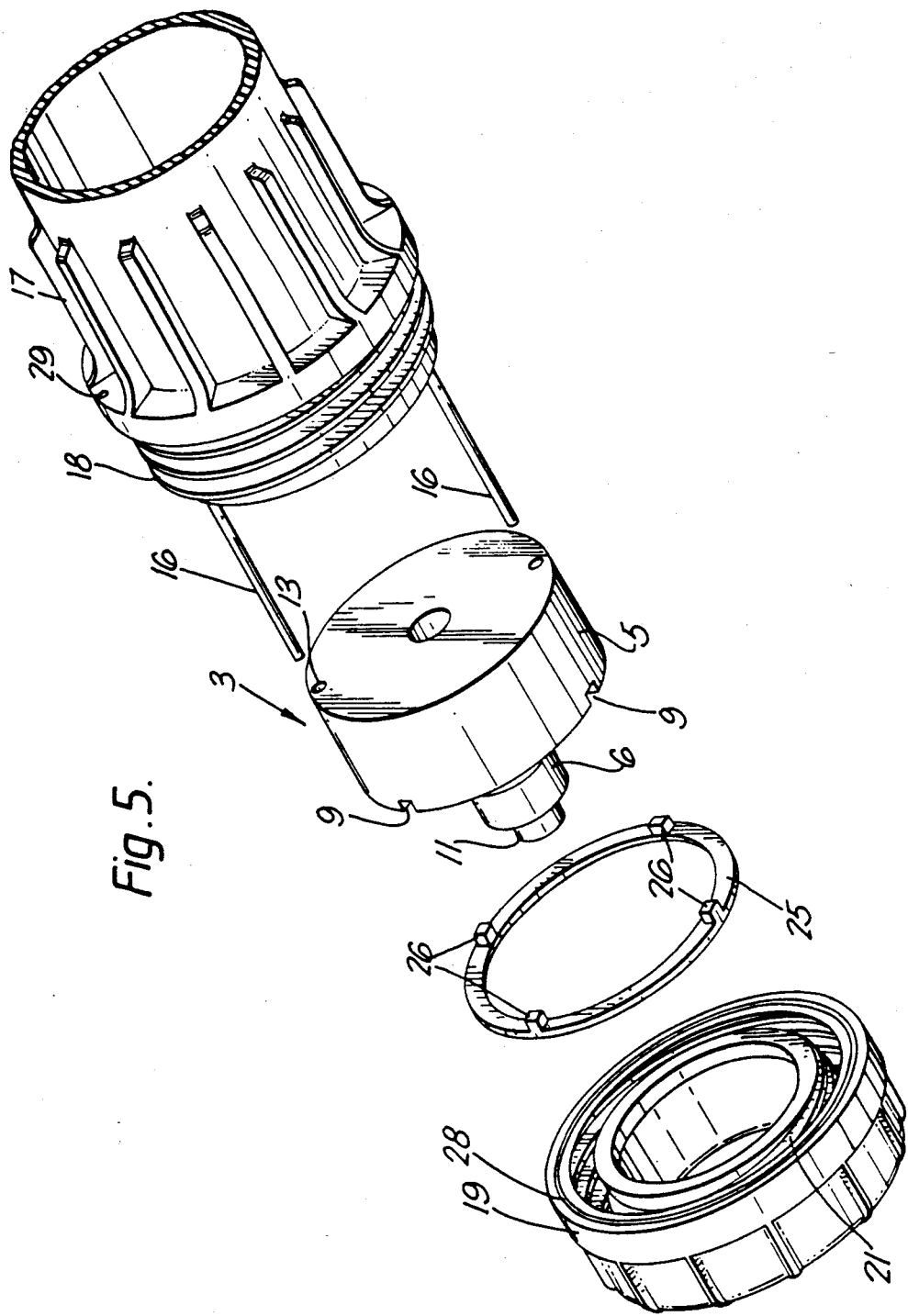

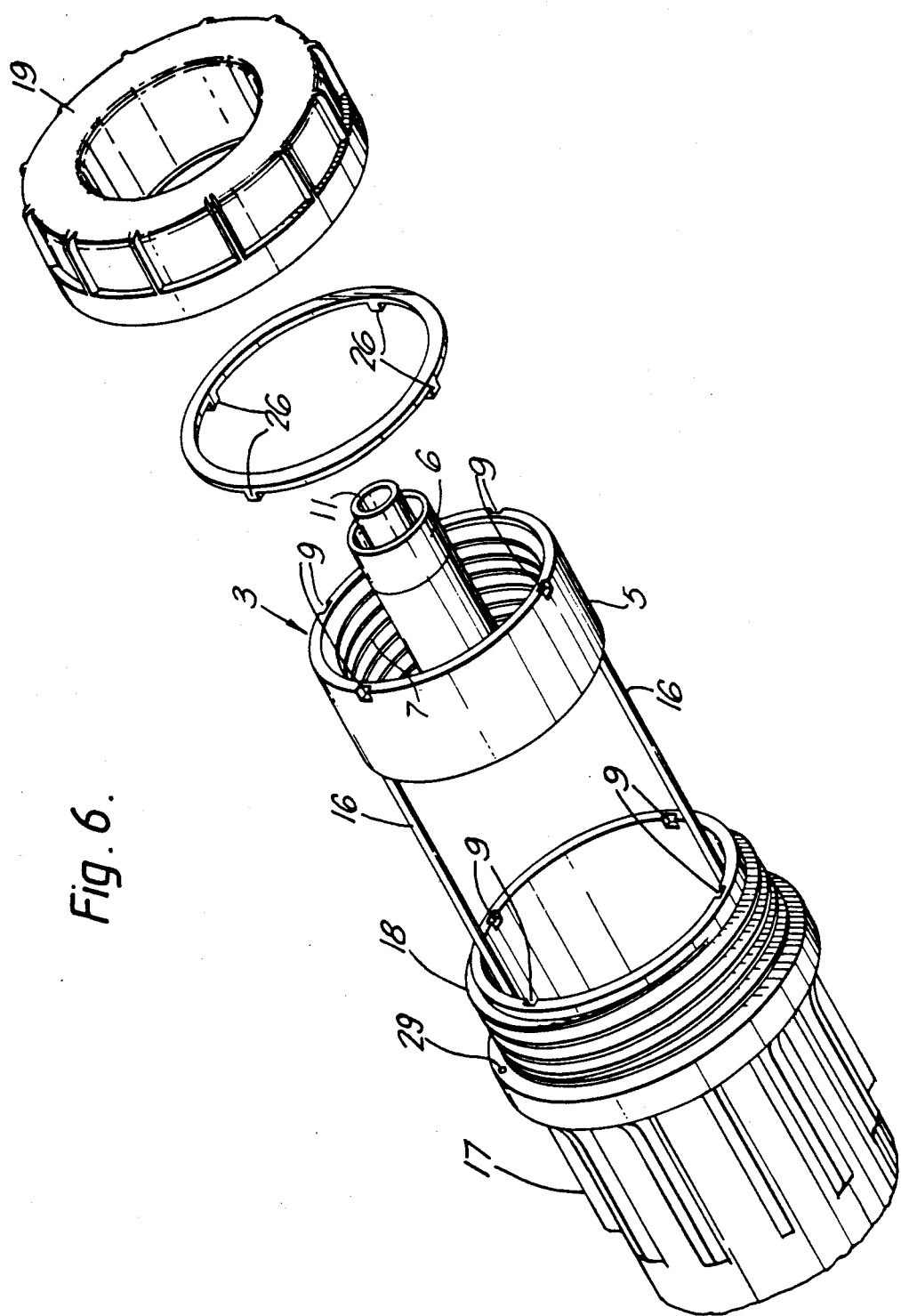

SEALED JOINTING APPARATUS

This invention relates to sealed jointing apparatus for use in the connection of conduit sections at a connection zone, and more specifically, but not necessarily, relates to a flexible hermetically sealed cable splice/jointing point.

The present invention will find particular use in the telecommunications and electric industrial fields. However it can also be used in gas or water pipe systems to enable greater flexibility in these systems.

Up until now, in telecommunication cable work with different types of cables, such as coaxial, fibre optical and multi-core, all types of cable closure method used the outside of the cable sheath for affixing the seal. Therefore the outer sheath of any cable had to enter into the area which would contain the conductor splices.

It has been well recognized within the electrical and telecommunication fields that this type of splice closure method often failed at the point of seal between the cable sheath and the main splice/joint sleeve, (referred to as the primary seal means) with the result that moisture could penetrate the joint thereby causing the failure of the contained circuits. In order to overcome these deficiences, the industries have used additional method steps which includes (1) air pressurization of the system and (11) splice/joint encapsulation using resins or jelly substances and oil filling of the splice area. These methods had the disadvantage of being expensive and labour intensive and in most cases the flexibility of the system was greatly impaired.

Also in this type of splice, the cables' aluminium screen had to be jumped across the splice by affixing a continuity wire to the butts of all cables contained within.

To enter previous straight through joints, cable seals have always had to be broken which again is expensive and time-consuming and depending on the size and type of cable very possibly a two-man operation.

It is an object of the present invention to obviate or mitigate these disadvantages and to provide a jointing point which can be both quickly entered and closed.

According to the present invention there is provided sealed jointing apparatus for use in the connection of conduit sections comprising an annular casing having open ends; spaced end closures at the end of the casing, and defining with the casing a connection zone into which conduit sections pass for jointing; and releasable securing means for releasably securing at least one of the end closures to the casing; said releasable securing means comprising an end cap including two radially spaced coupling threads, one of which coupling thread threadingly engages an external thread on the casing while the other coupling thread engages an internal thread on said one end closure whereby the casing is releasably coupled to said one end closure.

By means of the present invention, the conductor splices in joined telecommunication cable sections can be contained in a hermetically sealed zone bounded by the end closures and the casing, and access can be had to the cable splices simply by releasing the releasable securing means and pushing the casing aside: the end closure means remain in position and the primary seal means which are provided at the end closure are untouched. Closure of the joint simply comprises the reverse of this operation. It will be understood that such access without breaking the cable seal (i.e. the primary seal) provides considerable operational and economic advantages.

In a preferred embodiment, the end closure comprises at least one and preferably two annular members associated with a respective conduit section. Preferably, the or each annular member includes a rigid axially-extending auxiliary sleeve arranged such that there is formed in the annular member a closed-bottom annular slot to receive an end part of a telecommunication cable sheath, with the sleeve located between the sheath and a core part of the cable, so that functionings of the said primary seal means is facilitated. The sleeve can be of metal and can be used to provide screen continuity for the telecommunication cable.

The above apparatus can be used with primary seal means which comprises at least one gland seal on a respective annular member. Alternatively, the primary seal means may involve injection welding or heat shrinking between or around the annular member and one or more respective conduit sections.

Preferably, a pair of annular members are provided, and spacer means serve to axially space the annular members by a predetermined amount.

Embodiments of the present invention will now be described, by way of example, with reference to the accompanying drawings, in which:

FIGS. 5 and 6 show isometric "exploded" views of respective ends of the joint of FIG. 1;

Figure 1:
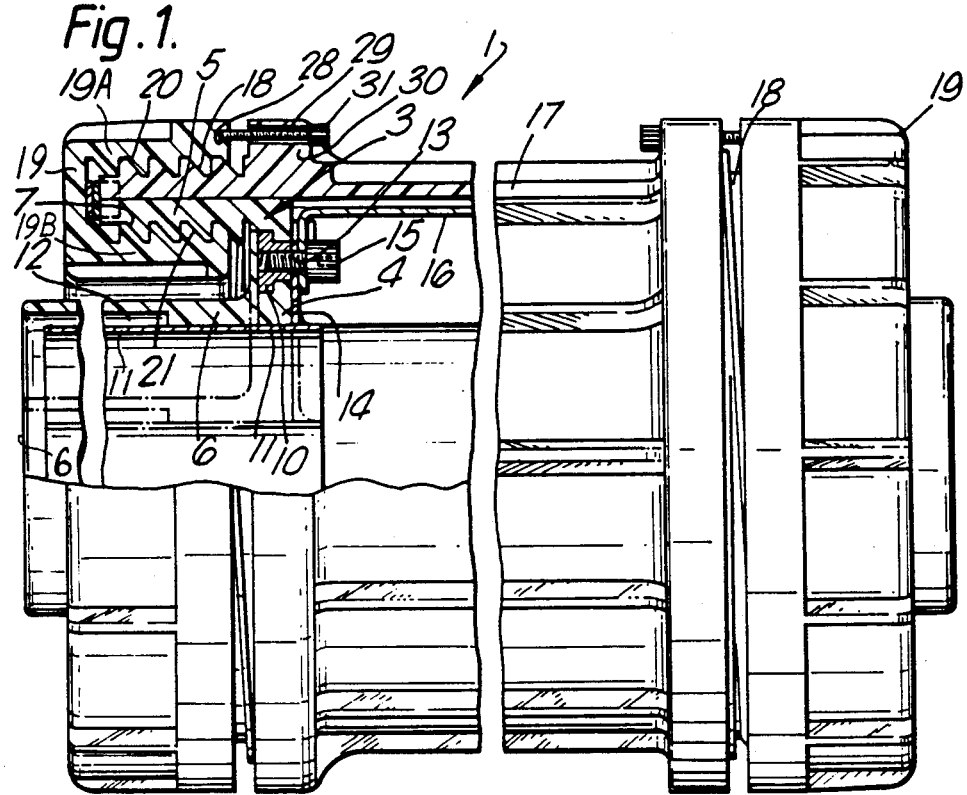
FIG. 1 shows a side view of a flexible hermetically sealed cable splice/jointing apparatus or joint, part of one end of which is shown sectioned.
Figure 7:
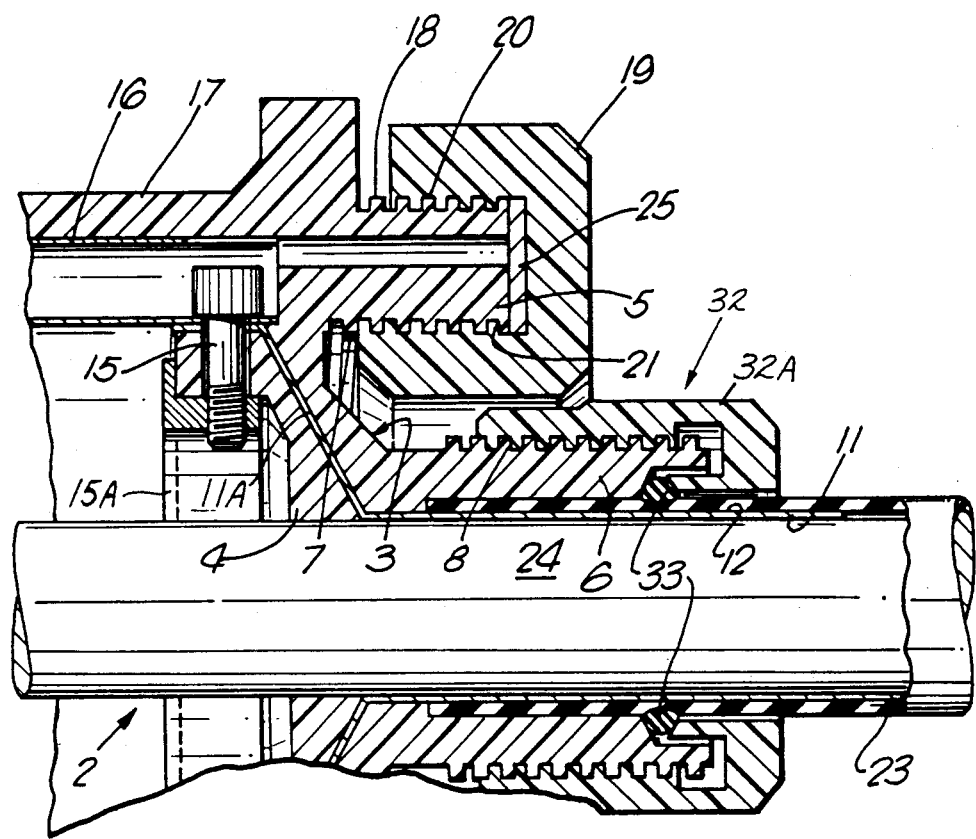
FIG. 7 shows a sectional view of one end of a modified jointing apparatus according to the present invention.

Referring to FIGS. 1 and 6 of the drawings, jointing apparatus 1 serving as a jointing point for the splicing of two telecommunication cable sections 2, (one of such cable sections 2 at one end of the apparatus being shown in FIG. 7: the cable section at the other end is similar) comprises a cylindrical casing 17 closed at the ends by similar end plugs 3. The apparatus 1 is symmetrical about a mid-transverse median plane and the casing 1 and the end plugs 3 define a closed chamber constituting a connection or jointing zone for the cable sections. Referring specifically to FIG. 1, each end plug 3 comprises a pair of axially-extending concentric annular walls 5, 6 which are joined by a radial base 4, an outer cylindrical surface of the outer wall 5 bearing against an inner cyclindrical wall portion at the respective end of the casing 17, and each end plug 3 is sealingly joined to the respective end of the casing 17 by an annular end cap 19 as will be explained in detail later. The inner wall 6 serves to closely surround the respective cable section 2.

Figure 2:
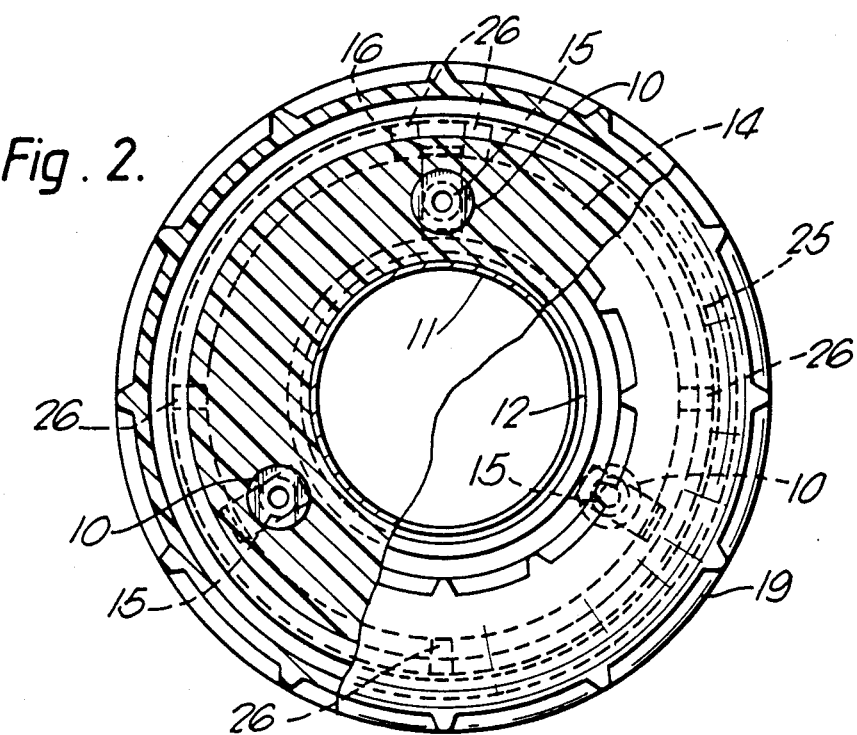
FIG. 2 shows a part end view of an end portion of the joint of FIG. 1 with part of an end closure cut-away.
Figure 3A:
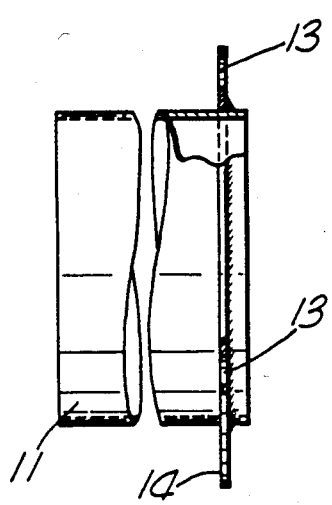
FIGS. 3A and 3B shows respectively a side view and an end view of a conductive tubular sleeve.
Figure 3B:
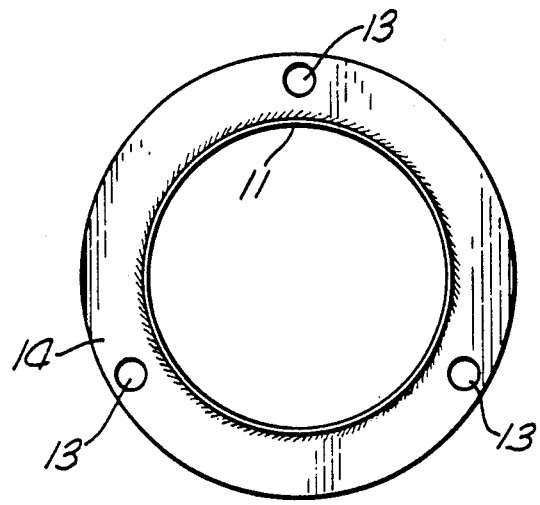

An auxiliary tubular sleeve 11 (FIG. 3A, 3B) of conductive metal is located at the inner side of wall 6, and the wall 6 is formed such that a closed bottom annular slot 12 is present between the sleeve and the wall 6. The sleeve 11 has a metal retaining ring 14 welded thereto at the inner end, and the ring 14 is connected to the radial base 4 by means of socket screws 15 which extend through equi-spaced holes 13 in the ring 14 to be received in threaded bosses 10 in the base 4: as can be seen in FIG. 2 three bosses 10 are provided in this example.

Figure 4A:
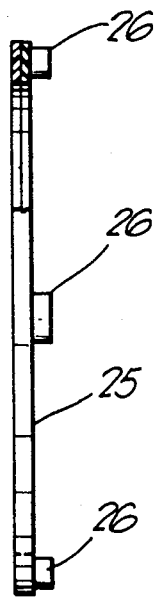
FIGS. 4A and 4B shows respectively a side view and an end view of a locating ring.
Figure 4B:
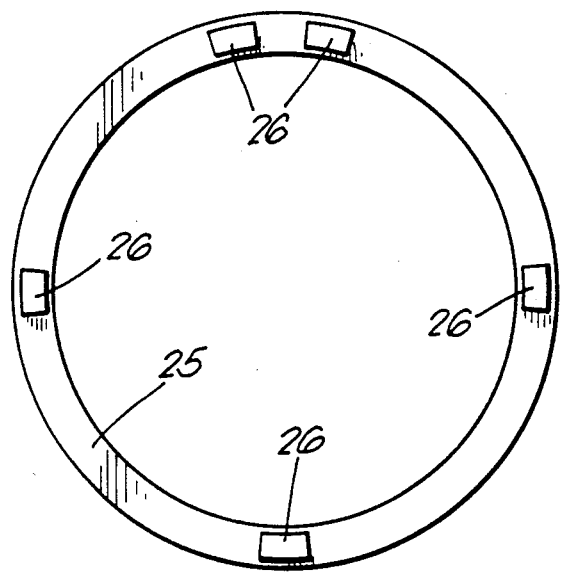

The two end plugs 3 are axially spaced at a predetermined distance by a spacer means comprising a pair of bars, rods or tubes 16 which are secured by means of the socket screws 15 tightened into bosses 10. The metal sleeve 11, ring 14 and tubes 16 provide screen continuity for the cable sections. Each end of the casing 17 carries an external thread 18 while the wall 5 of each plug 3 carries an internal thread 7. The annular end cap 19 carries a pair of opposed threadings 20, 21 on axial walls 19A, 19B which can engage with the threads 20 and 7 respectively so that the cap 19 can be screwed onto the threads 7, 18 to secure the casing 17 to the end plug 3. The axial length of the spacer tubes 16 is precisely set to permit accurate positioning of the threads, 7, 18 at each end. The casing ends and axial walls 5 of end plugs 3 at their contiguous ends have a series of recesses 9, and a locating ring 25 is provided (FIGS. 4A and 4B) on one face of which ring a series of complementary shaped keys 26 are provided to locate in aligned recesses 9 of the cap 5 and the casing 17 for annular alignment of the threads 7, 18. The space intervals between the recesses 9 and keys 26 is selected as shown so that there is only one possible registry location. The ring 25 is a laminate of a poly-vinyl-chloride (P.V.C.) washer moulded with the keys 26 and a silicone rubber washer fitted over the keys 26 to abut, in use, against the ends of the casing 17 and wall 5 as shown in FIG. 1. the locating ring 25 in conjunction with the first seal means ensures that the cable connection zone is hermetically sealed. The end cap 3 and casing 17 are of a plastics material having a U-V stabiliser such as carbon black as may the end plug. The cap 19 can be knurled (as shown) to facilitate tightening. A primary seal means is provided between the wall 6 and the respective cable section 2 to prevent ingress of moisture to the interior of the apparatus 1 and this seal means can be in different forms depending on the use of the joint. For the apparatus shown in FIGS. 1 to 6, the primary seal means can be either a heat shrinkable collar or a jointing compound injection welded between the wall 6 and the associated cable section. A hand jointing tool to facilitate the splicing operation of the cable sections 2 can be provided in the casing 17.

In the modified jointing apparatus shown in FIG. 7 the spacer tubes 16 are located by socket screws 15 which extend radially to engage a locating ring 15A. Further, the sleeve 11 has radial portions 11A which pass in slots in the plug base 4 and are clamped by the screws 15, and the primary seal means in this example comprises a gland seal 32 including a sealing ring 32A.

The jointing (splicing) operation is carried out as follows:

Prior to preparation of the cable sections 2 the appropriate parts are placed over the respective cable section and in the following sequence: end cap 19 and then end plug 3. The casing 17 can be placed over any one of the two sections 2. The following description relates generally to the operation at one end of the joint; the operation at the other end is similar. The cable end is now prepared for splicing by removing a length of the outer sheath 23 (see FIG. 7) taking care not to disrupt the core formation 24 as this will make the placing of the end plug difficult and could cause damage to the insulation of the conductors contained in the cable. The cable core 24 is now fed through the metal sleeve 11 of the plug and the cable sheath 23 fully inserted into the slot 12 so that the sleeve 11 is placed between the sheath 23 and the core shield (not shown) to provide screen continuity.

The spacer tubes 16 are now placed in position joining both end plugs 3, and secured by the socket screws 15. As will be noted, the axial length of the tubes 16 is significant since it controls the marriage of the end plug 3 to the main sleeve or casing 17 by means of the double threaded end cap 19.

The conductor pairs of the cable sections 2 are now ready for splicing, and splicing is facilitated by the hand tool so leaving the hands free for the splicing operation. When splicing has been completed, the casing 17 is positioned between the end plug 3 and secured by the end caps 19 which are screwed onto the casing 17 and into the end plug 3 in the same operation. Final tightening of the end cap 19 should be done using two strap wrenches, one to hold the casing 17 and the other to tighten the end cap 19. The locating ring 25 and keys 26 prevent relative movement between casing 17 and end plug 3 during the tightening operation.

To re-enter the joint at any time only the end caps 19 need be unscrewed to enable the casing 17 to be pushed aside; the primary seal means and screen continuity will remain in position untouched. The rigid nature of the sleeve 11 will ensure effectiveness of the primary seal means. The above splice joint provides the additional significant advantage of the sheath not having to be brought into the splicing area, since the sheath end is located in the slot 12. By this arrangement the possibility of splice failure due to ingress of moisture is virtually ruled out. Modifications are of course possible. Thus, for example, only one end of the joint may conform to the arrangement shown in FIG. 2. Also the casing may only have a single entry i.e. the other end may be blind.

The above description relates only to the joining of the sections of a single cable; however by providing the end plug 3 with two or more spaced bores each with axial wall projections, the jointing of two or more cables is possible in the single jointing apparatus. Also, the bores may be initially blind and are subsequently cut to provide through bores only when required for use. While the example describes apparatus for the splice joint for a telecommunication cable, it is also applicable to an electrical cable and substantally similar apparatus could be used for the connection of conduits in gas and water pipe systems; in this case it would probably not be necessary to include the auxiliary sleeve 11.

The primary seal means selected for use with fibre optic cables and primary or main cables is preferably provided by a jointing compound between the wall 6 and the relevant cable section obtained by injection welding; with secondary cables and cable T.V. cables a heat shrinkable collar is preferably fitted over the end of the wall 6 and heat shrunk onto the cable section; and with fluid pipes, the wall 6 preferably has an external screw thread 8 to receive a sealing gland nut 32A (FIG. 7) to be tightened thereonto, a gland seal of a silicone rubber O-ring 33 being located to be tightened against the conduit section.

The end caps are preferably provided with an annular channel 28 to be in registry with a bore 29 provided in a shoulder 30 of the casing 17 as shown. A security bolt 31 is screwed into bore 29 and impinges into the walls of the channel to hold the cap in position against unauthorised entry.

We claim:

1. Sealed jointing apparatus for use in the connection of conduit sections comprising an annular casing having open ends; spaced end closures at the ends of the casing, and defining with the casing a connection zone into which conduit sections pass for jointing; and releasable securing means for releasably securing at least one of the end closures to the casing; said releasable securing means comprising an end cap having an aperture and including two radially spaced coupling threads, one of which coupling threads threadingly engages an external thread on the casing while the other coupling thread engages an internal thread on said at least one end closure whereby the casing is releasably coupled to said at least one end closure.

2. Apparatus as claimed in claim 1, wherein alignment means are provided for relative positioning of said internal and external threads to facilitate screw fitment of the end cap onto said at least one end closure and the casing.

3. Apparatus as claimed in claim 1, wherein the end closures comprise annular members.

4. Apparatus as claimed in claim 1, wherein an end closure includes a closed-bottom annular slot concentric with the respective aperture to receive a sheath portion of a sheath encased cable section.

5. Apparatus as claimed in claim 4, wherein the at least one end closure comprises an annular member and a rigid axially-extending auxiliary sleeve arranged to form with the annular member said closed bottom annular slot.

6. Apparatus as claimed in claim 5, wherein the sleeve is of metal and serves to provide screen continuity for conduit sections comprising a telecommunication cable.

7. Apparatus as claimed in claim 1, wherein a primary seal means is provided in the form of a gland seal carried by an end closure.

8. Apparatus as claimed in claim 2, wherein said alignment means comprises an indexing ring having indexing elements thereon, aperture means being provided in the casing and in said at least one end closure to receive said indexing elements.

9. Apparatus as claimed in claim 1, wherein spacer means extend between the end closures and serve to axially space the end closures by a predetermined amount.

10. Apparatus as claimed in claim 9, wherein the spacer means comprises at least two rods.

* * * * *